United States Patent [19]

Broadway et al.

[11] 3,973,154
[45] Aug. 3, 1976

[54] ELECTRIC MOTORS

[75] Inventors: Alexander Richard William Broadway; William Fong; Gordon Hindle Rawcliffe, all of Bristol, England

[73] Assignee: National Research Development Corporation, England

[22] Filed: Dec. 30, 1974

[21] Appl. No.: 537,348

[30] Foreign Application Priority Data

Jan. 4, 1974 United Kingdom............ 415/74

[52] U.S. Cl. ............ 310/184; 318/224 A
[51] Int. Cl.² .................... H02K 3/00
[58] Field of Search ....... 310/172, 202, 179, 198, 310/180, 188, 184, 194, 203–208, 254, 258, 259; 318/224 A, 224, 223

[56] References Cited
UNITED STATES PATENTS

| | | | |
|---|---|---|---|
| 3,233,160 | 2/1966 | Rawcliffe | 318/224 A |
| 3,270,264 | 8/1966 | Miner | 318/223 |
| 3,295,034 | 12/1966 | Herzog | 318/224 |
| 3,588,649 | 6/1971 | Heine | 318/224 |
| 3,619,748 | 9/1969 | Eastham | 318/224 |
| 3,697,842 | 10/1972 | Morrill | 318/223 |
| 3,826,960 | 7/1974 | Broadway | 318/223 |

*Primary Examiner*—R. Skudy
*Attorney, Agent, or Firm*—Larson, Taylor and Hinds

[57] ABSTRACT

A two-speed, single-phase a.c., shaded-pole, induction motor with pole-changing, in ratio other than 2:1, by pole-amplitude modulation. The motor has stator and squirrel-cage rotor elements. The stator is made with an even number of salient poles, arranged as an even number of pole-groups, wound with at least one less number of coils than poles. Pole-changing is by reversal of the coils of consecutive pole-groups.

6 Claims, 7 Drawing Figures

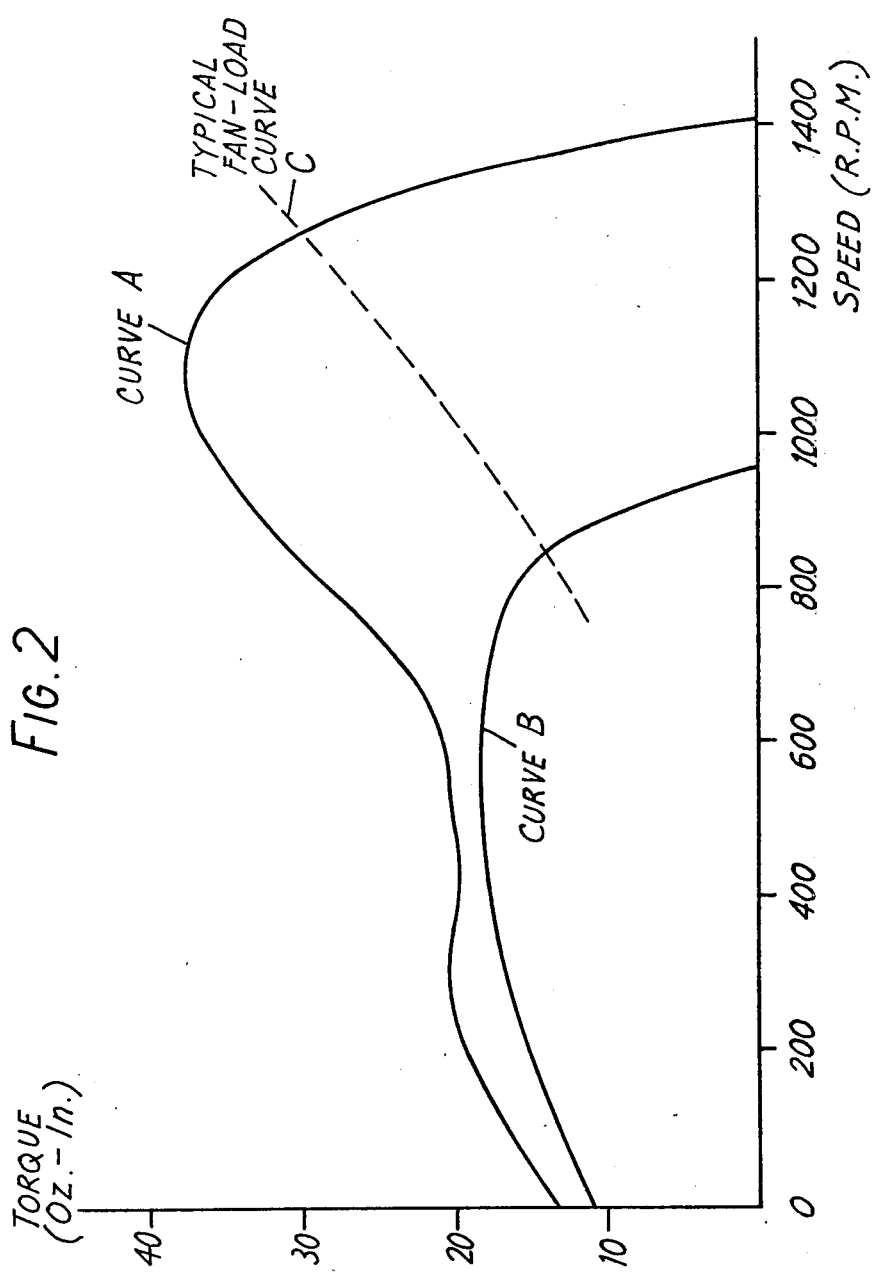
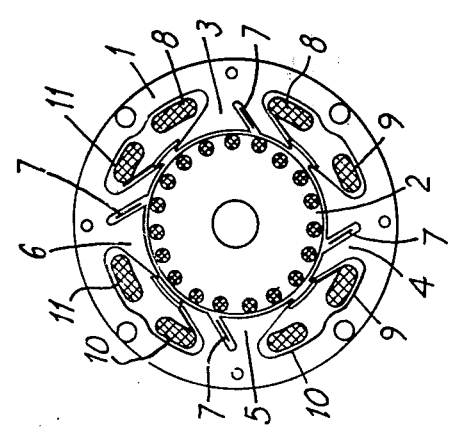

ELECTRIC MOTORS

This invention relates to electric motors, particularly to two-speed, shaded-pole induction motors.

The object of the invention is to provide an improved motor of this kind.

Shaded-pole induction motors are known having a squirrel-cage rotor and wound stator of salient-pole, or quasi-salient pole form. The shaded-pole type of motor is characterised in that a portion of the tip of each salient pole is embraced by a copper ring. Up to one-third of the pole face is commonly enclosed in this way.

The main stator winding comprises coils wound around the salient poles. The copper rings function collectively as an inductively-fed auxiliary winding. Together, the windings provide a rotating field in which the rotor rotates.

Most usually, shaded-pole motors are two-pole, four-pole or six-pole machines, although the principle applies to other pole-numbers. Of these, the four-pole machine is probably the most important, commercially.

There are also known pole-changing four-pole/two-pole, shaded-pole motors. The method of pole-changing is similar to the Dahlander method, which always provides a 2:1 speed ratio.

In U.S. Pat. No. 3,826,960 there is described a pole-changing six-pole/four-pole motor in which pole-changing is effected by the method of pole-amplitude modulation.

According to single-phase, pole-amplitude modulation theory, considering a four-pole salient-pole winding comprising four coils wound round four equally-spaced poles, if coils 3 and 4 (or the first pair of coils 1 and 2) are reversed in current-carrying sense, then a mixed field of four$\pm$two poles, that is six-poles and two-poles is produced. In practice, if a pair of coils of a conventional four-pole, shaded-pole motor are reversed in this way, the motor will then operate at the six-pole speed; the two-pole component being, in effect, neutralised by the squirrel-cage rotor. The performance at six-poles is unsatisfactory in that the torque is low and slip is considerable, due to the poor utilisation of main-winding copper. The winding factor for six-poles is only 0.5.

Accordingly, to provide a satisfactory four-pole/six-pole machine, modification of the standard four-pole arrangement must be made to improve the six-pole performance considerably at the expense of some impairment of the four-pole performance. U.S. Pat. No. 3,826,960 discloses an expedient with this object. Such a modified machine provides four-pole or six-pole working with four stator coils wound around four salient poles of an asymmetrically pole-spaced stator.

The present invention, however, provides a two-speed single-phase alternating current, shaded-pole, induction motor of the pole-amplitude modulation pole-changing type, providing alternative running pole-numbers in a ratio other than 2:1, including a stator formed with an even number of salient poles comprising an even number of pole-groups, each pole group having stator windings comprising a number of coils less, by at least one, than the number of poles, pole-changing being effected by reversal, in current-carrying sense, of the said coils of consecutive pole groups.

If the machine is provided solely with two pole-groups, and thus two coils or two coil-groups, one half of the stator winding is reversed with respect to the other half. The alternative pole-numbers then differ by two poles.

Performance of the motor at the higher pole-number may be improved, at the cost of performance at the lower pole-number, by using an asymmetrical stator punching.

In order that the invention may be readily carried into practice, a known form of shaded-pole motor and three embodiments of pole-changing, shaded-pole motors according to the invention will now be described in detail, the latter embodiments by way of example, with reference to the accompanying drawings, in which:

FIG. 1 is a cross-section view of a conventional four-pole, shaded-pole induction motor, with wound stator and a squirrel-cage rotor;

FIG. 2 is a graph showing, in Curve A, four-pole performance and, in Curve B, the six-pole performance of the motor of FIG. 3;

Throughout the various figures of the drawings, the same or similar elements are indicated by the same reference numerals.

Figure 3:
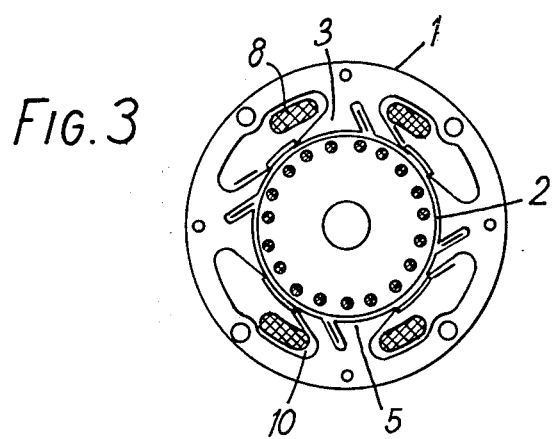
FIG. 3 is a cross-section view of a two-coil, four-pole/six-pole, shaded-pole motor according to the invention.

FIG. 1 shows in cross-section a stator punching 1 and squirrel-cage rotor 2 of a four-pole, shaded-pole motor of conventional type. The stator has four, equally spaced-apart, salient poles, 3, 4, 5 and 6, each with a copper ring 7 embracing a part of the pole tip. Four coils 8, 9, 10 and 11 are wound on the poles 3, 4, 5 and 6, respectively.

FIG. 2, Curve A shows the four-pole, torque-speed characteristic of the motor of FIG. 1.

It is found that the four-coil arrangement of FIG. 1 is not essential, in that the field of the arrangement of FIG. 1 can be produced by two coils of approximately double size wound on an opposing pair of poles, for example as coils 8 and 10 on poles 3 and 5, and excited in the same sense magnetically. Such an arrangement is shown in FIG. 3. In practice, both the leakage reactance and the resistance of two double-size coils are slightly greater than the four-coil standard arrangement.

Tests have established that a two-coil embodiment, with each coil wound with 1.85 times the number of turns of coils for the four-coil embodiment, has resistance and leakage reactance values and a performance characteristic which is indistinguishable from the standard four-coil motor.

FIG. 2, Curve A thus shows the four-pole, torque-speed characteristic of the two-coil motor with 7.5% reduction in coil turns (compared with double the four-coil turns number).

The two-coil embodiment of the motor is easier to manufacture than the four-coil embodiment and is simpler for pole changing, in that only the two coils require reversal the one with respect to the other.

Figure 4:
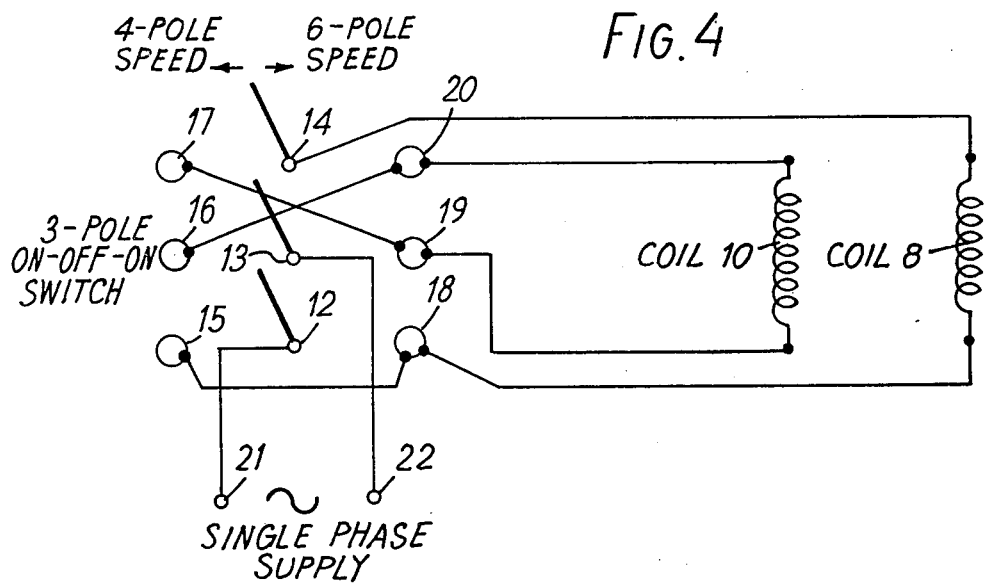
FIG. 4 is a circuit diagram showing the four-pole and six-pole switching of the motor of FIG. 3.

FIG. 4 is a circuit diagram of the four-pole/six-pole switching arrangement. A three-pole, on-off-on switch has terminals 12, 13 and 14 which may be isolated or connected to terminals 15, 16 and 17 or to terminals 18, 19 and 20, alternatively. A single-phase, alternating current supply at terminals 21 and 22 is connected to terminals 12 and 13. Coil 8 is connected between terminals 18 and 14. Coil 10 is connected between terminals 19 and 20. Terminals 15, 18, terminals 16, 20 and terminals 17, 19 are linked in pairs. Connection of terminals 12, 15; 13, 16 and 14, 17 by throw of the switch, provides four-pole running. Connection of terminals 12, 18; 13, 19 and 14, 20, by opposite throw of the switch, provides six-pole running. Four leads only require to be brought out from the stator.

By the six-pole switching position described, the coils 8 and 10 are energised oppositely, in magnetic sense. A mixed field of six-poles and two-poles is established. The machine operates at six-pole speed with much increased torque and reduced slip compared with the reversed coil-pair six-pole condition of the four-coil motor of FIG. 1. The six-pole winding factor is 0.707 for the two-coil arrangement, compared with 0.5 for the four-coil arrangement. FIG. 2, Curve B shows the six-pole, torque-speed characteristic of the two-coil motor of FIG. 3. FIG. 2, Curve C, which cuts the four-pole running Curve A and the six-pole running Curve B, represents a typical fan-load characteristic and shows that the four-pole/six-pole motor of FIG. 3 is well-suited for fan duty.

Figure 5:
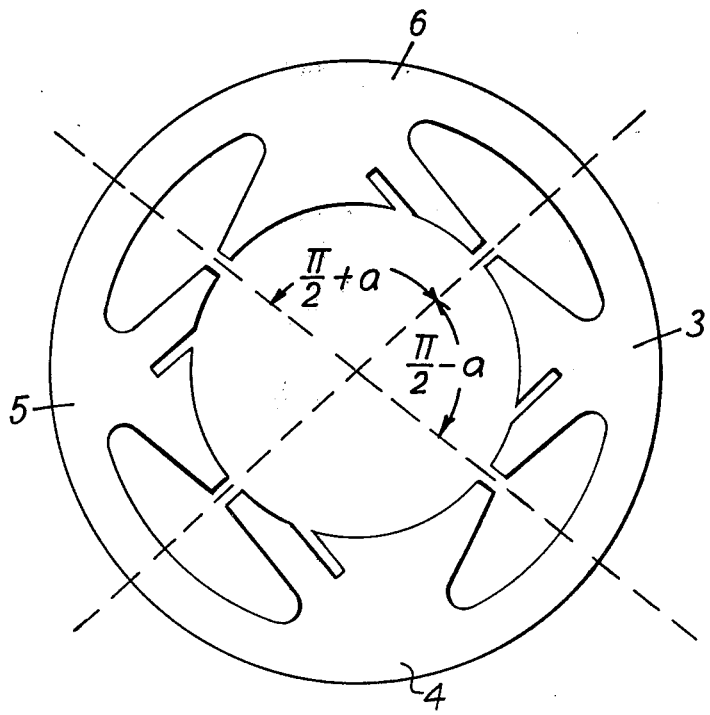
FIG. 5 is a cross-section view of an asymmetrical stator punching.

If further improvement of the six-pole performance is desired at the cost of reduced four-pole performance, an asymmetrical punching can be used. FIG. 5 shows such an asymmetrical punching for replacement of the regular punching in the stator 1 of the motor of FIG. 3.

In FIG. 5, the diameter through one pair of pole gaps is offset by an angle $\alpha$. Thus the pole faces 4 and 6 subtend the increased angle of $\pi/2 + \alpha$ and the pole faces 3 and 5 subtend the diminished angle of $\pi/2 - \alpha$.

If the angle $\alpha$ is zero, the punching of FIG. 5 becomes regular, as shown in FIG. 3. The maximum value of $\alpha$ is $\pi/6$, which corresponds to the angle which would be subtended by one pole in a regular six-pole punching. Between these limiting values of the angle $\alpha$, a satisfactory compromise between six-pole and four-pole running may be found.

In theory, it is unimportant whether the two coils 8 and 10 are wound on the larger poles 4 and 6 or on the smaller poles 3 and 5. In practice, it is easier to wind the coils on the smaller poles.

Figure 6:
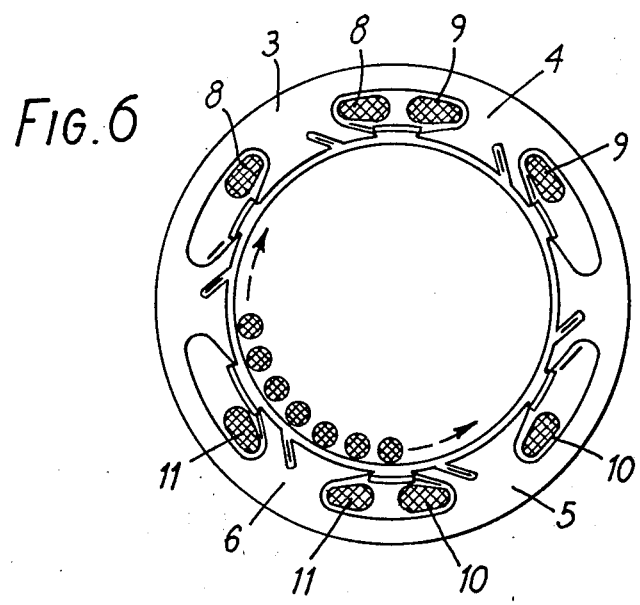
FIG. 6 is a cross-section view of a six-pole/eight-pole, shaded-pole motor with a four-coil arrangement.

Another embodiment of shaded-pole motor according to the invention is the six-pole/eight-pole motor of FIG. 6.

The standard, known, six-pole, shaded-pole motor has a stator with six, regularly spaced-apart salient poles, each pole with a coil wound thereon. If such a motor were energised with three consecutive coils reversed in current-carrying sense to provide the pole sequence N-S-N-N-S-N, or the reverse thereof, a mixed field of six±two poles, that is eight poles and four poles results. The four-pole component is neutralised by the action of the squirrel-cage rotor and the motor does, indeed, run at the eight-pole speed. However, the eight-pole performance is unsatisfactory, due to poor utilisation of the main winding copper, the eight-pole winding factor being only 0.578.

In the motor of FIG. 6, two of the six coils of the standard winding are omitted leaving coils 8, 9, 10 and 11 on the four poles 3, 4, 5 and 6, only. These remaining coils are wound with 1.25 times the number of turns used for each coil of the six-coil standard motor. These four coils are energised, for six-pole running, to give the pole sequence of N-S-zero-S-N-zero. The six-pole winding factor is unity.

Upon reversal, for eight-pole running, the coils of two consecutive poles are reversed relatively to the other pair of coils to give the pole-sequence of N-S-zero-N-S-zero. The eight-pole winding factor is then 0.75.

Using series-series/series-reversed switching of the coil pairs, the six-pole/eight-pole motor of FIG. 6 gives a six-pole performance indistinguishable from that of the standard six-pole motor described and an eight-pole performance in which the peak torque is about 75% of the peak torque for six-pole running.

Figure 7:
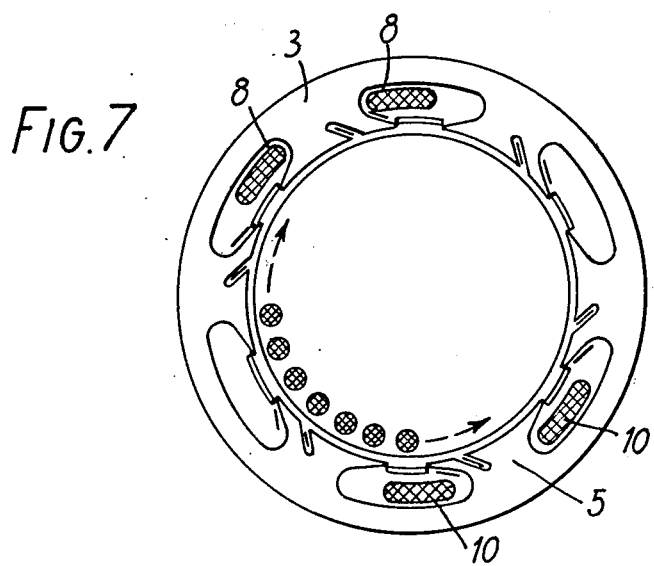
FIG. 7 is a cross-section view of a six-pole/eight-pole, shaded-pole motor with a two-coil arrangement.

A two-coil arrangement may also be used for a six-pole/eight-pole motor according to the invention and such a stator arrangement is shown in FIG. 7. In FIG. 7, four of the total six coils of the standard six-pole motor are omitted. The remaining two coils 8 and 10, wound on the diametrically opposed poles 3 and 5, are each wound with approximately double the number of turns of each coil of the standard six-coil arrangement.

For six-pole operation, the two coils are energised to give the pole-sequence of zero-N-zero-zero-S-zero. For eight-pole operation, one coil is reversed relatively to the other to give the pole-sequence of zero-N-zero-zero-N-zero, or the reverse thereof.

The winding factor for six-pole running is unity and for eight-pole running is 0.866. The two-coil motor of FIG. 7 is well suited for constant-torque applications.

What we claim is:

1. A two-speed, single-phase alternating current, shaded-pole, induction motor of the pole-amplitude modulation pole-changing type, providing alternative running pole-numbers in a ratio other than 2:1, including a stator formed with an even number of salient poles, said stator having a stator winding comprising a number of coils less, by an even number, than the lower of said alternative pole-numbers, pole-changing being effected by reversal, in current-carrying sense, of one half the number of said coils.

2. A two-speed, single-phase alternating current, shaded-pole, induction motor as claimed in claim 1, in which the alternative running pole-numbers are four-poles and six-poles.

3. A two-speed, single-phase alternating current, shaded-pole, induction motor as claimed in claim 2, in which said stator is formed with four equally spaced-apart salient poles, defining two opposing pairs of poles, having one coil wound on each pole of one pair only of said two opposing pairs of poles.

4. A two-speed, single-phase alternating current, shaded-pole, induction motor as claimed in claim 1, in which said even number of stator salient poles are arranged as opposing pairs of poles unequally spaced-apart around the said stator.

5. A two-speed, single-phase alternating current, shaded-pole, induction motor of the pole-amplitude modulation pole-changing type, providing alternative running pole-numbers in a ratio other than 2:1, including a stator formed with an even number of salient poles comprising an even number of pole-groups, each pole-group having stator windings, comprising a number of coils less, by at least one, than the number of poles, pole-changing being effected by reversal, in current-carrying sense, of the said coils of consecutive pole groups, for providing alternative pole-numbers of six-poles and eight-poles, having the stator formed with six equally spaced-apart salient poles and having one coil wound on each of an opposing pair of poles.

6. A two-speed, single-phase alternating current, shaded-pole, induction motor of the pole-amplitude modulation pole-changing type, providing alternative running pole-numbers in a ratio other than 2:1, including a stator formed with an even number of salient poles comprising an even number of pole-groups, each pole group having stator windings comprising a number of coils less, by at least one, than the number of poles, pole-changing being effected by reversal, in current-carrying sense, of the said coils of consecutive pole groups, for providing pole-numbers of six-poles and eight-poles, having the stator formed with six equally spaced-apart salient poles and having one coil wound on each of two pairs of opposing poles.

* * * * *